United States Patent [19]

Iddon et al.

[11] 4,201,481

[45] May 6, 1980

[54] SCROLLS FOR EXTRUDING MACHINES

[75] Inventors: Michael I. Iddon, Leyland; Donald M. Turner, Bath, both of England

[73] Assignee: Iddon Brothers Limited, Lancaster, England

[21] Appl. No.: 950,443

[22] Filed: Oct. 11, 1978

[51] Int. Cl.² .............................................. B29B 1/06
[52] U.S. Cl. ...................................... 366/79; 366/318
[58] Field of Search ................... 366/79, 83, 84, 88, 366/89, 90, 318–324; 425/201, 208, 209; 264/349

[56] References Cited

U.S. PATENT DOCUMENTS

| | | | |
|---|---|---|---|
| 3,946,998 | 3/1976 | Menges et al. | 366/88 |
| 4,107,260 | 8/1978 | Dougherty | 264/349 |
| 4,128,341 | 12/1978 | Hsu | 366/89 |

*Primary Examiner*—Leonard D. Christian
*Attorney, Agent, or Firm*—Norris & Bateman

[57] ABSTRACT

A rotatable scroll for a rubber extruding machine comprising a series of vanes in the base of channels in the scroll to redirect the material into a surface layer and to direct lumps of material to one edge of the channel and a ramp or ramps over which the lumps flow with a small clearance between the ramp and the barrel.

5 Claims, 4 Drawing Figures

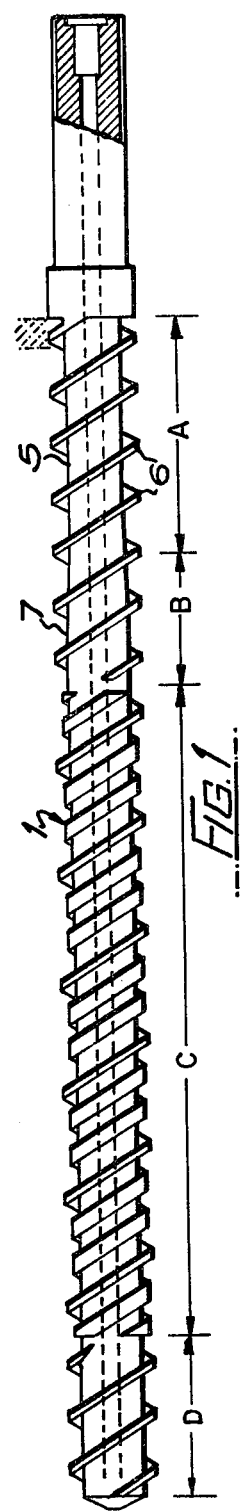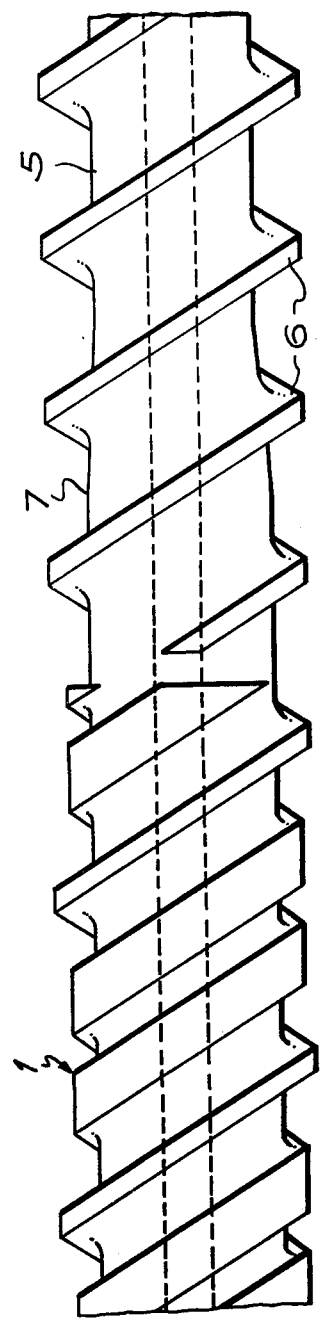

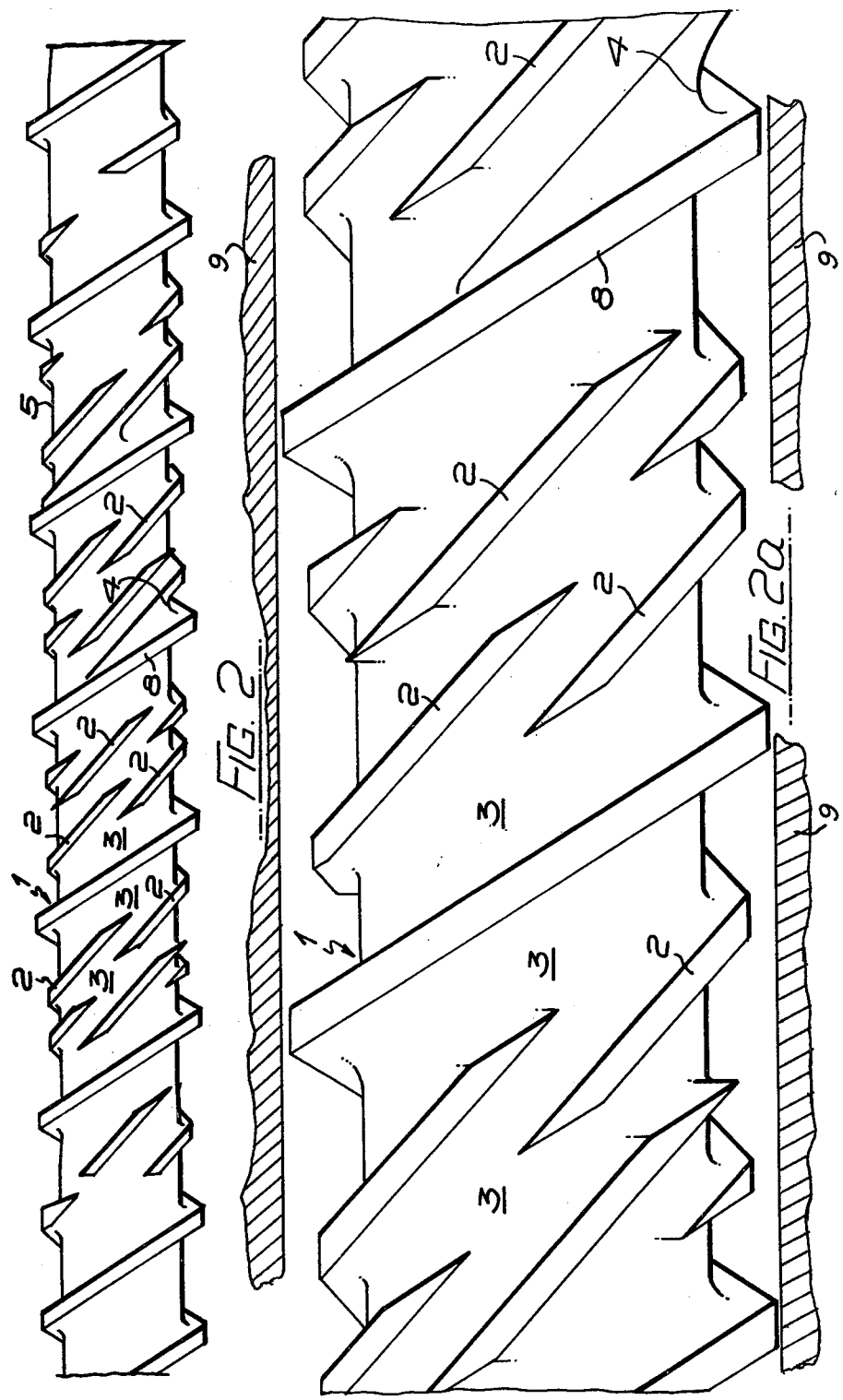

SCROLLS FOR EXTRUDING MACHINES

This invention relates to improvements in scrolls for extruding machines for processing polymeric materials and in particular natural and synthetic rubber in strip, granular, powder or any other form, and is an improvement of the invention described in the Specification of Application Ser. No. 852,869, now U.S. Pat. No. 4,131,368.

In the Specification of Application Ser. No. 852,869, now U.S. Pat. No. 4,131,368 we have claimed a rotatable scroll for an extruding machine comprising a series of helical flights and means in at least one longitudinal zone along the scroll providing a series of facets arranged in pairs between the helix flights, the facets of each pair being alternatively angled in an upward and then downward direction relatively to the helix leading or trailing edges, the pairs of facets being repeated along the length of the zone, and disposed around the root diameter of the scroll between successive flights in the zone each of said surfaces being inclined inwardly from adjacent the outer periphery of the scroll flight.

Modern extruders accept feed materials at room temperature. The first action of an extruder is to place the outer surfaces of the feed material in an intensive shear field which increases their temperature and makes that part of the rubber flow more readily. Hence the material entering the barrel rapidly becomes inhomogeneous. The centre of the channels in the scroll is occupied by lumps or rubber which receive little working early on and these now pass rapidly down the channels to reach the die end at a substantially lower temperature than the surrounding material. Consequently the extrudate emerges from a die with unacceptable variations both in a cross section and possibly more important its physical properties. This problem is most severe when the extruder is operated at high speed and when there is insufficient time for the rubber in the channels to achieve uniform temperature by thermal conduction.

Although the arrangement described in U.S. Pat. No. 4,131,368 gives satisfactory results we have found that the present construction of scroll is simpler to manufacture.

The object of the present invention is to modify the scroll to ensure that any material occupying the centre of the channel is redirected into a surface layer.

According to the invention a scroll rotating in a barrel of an extruding machine comprises a series of vanes in the base of channels in the scroll to redirect the material into a surface layer and to direct lumps of material to one edge of the channel, and a ramp or ramps over which the lumps flow with a small clearance between the ramp and the barrel.

The invention will be described with reference to the accompanying drawings:

FIG. 1 shows an elevation of a scroll in the course of manufacture and illustrates how the metal can be left for the formation of the vanes;

FIG. 1a shows an enlarged elevation of part of FIG. 1;

FIG. 2 shows an elevation of a completed blending zone for the scroll to a larger scale; and FIG. 2a shows an enlarged elevation of part of FIG. 2.

A scroll rotating in the barrel 9 (FIG. 2a) of an extruding machine is formed with a series of vanes 2 in the base of channels 3 in the scroll which ensure that any material occupying the centre of the channel 3 is redirected into a surface layer. A sufficient number of vanes 2 are included to ensure that the material has been redirected sufficiently frequently to provide a highly homogeneous material by the time it reaches the die. The system of the vanes 2 also ensures that in particular large lumps of cold material are brought to one edge of the channel where they can be forced to flow over a ramp 4 with a small clearance between its surface and the top of the barrel 9.

The presence of two or more of these ramps 4 in the early stages of the channel 5 containing the vanes 2 provides assurance that all the material which is not plasticised at the feed end of the scroll is broken into small pieces which can then be thoroughly dispersed by the continued action of the vanes.

The scroll is composed of four or more zones, a feed zone A, a compaction zone B, a blending zone C and a delivery zone D as shown in FIG. 1.

The feed zone A by virtue of a deeper channel 5 or a longer lead 6 has a higher transport capability than the rest of the screw to feed material into the barrel at a sufficient rate. The compaction zone B reduces either the channel depth 7 or the lead length to ensure that the blending zone C is completely filled with rubber. When the blending zone C or zones are reached one flight, is terminated and is replaced by a series of vanes 2. A certain amount of inter-changeability of the zone configuration may be developed dependent upon the nature of the material being processed, and in particular the compaction and blending zones may be duplicated or interchanged to suit the individual process.

The purpose of arranging a number of separate vanes 2 is to provide a plurality of routes for the rubber to take down the channel so that the streams are continually divided and re-combined.

In this way thorough blending is assured. At the same time the vanes 2 must not provide excessive impedance as this will impair the flow of rubber and hence reduce the output. The rubber in passing down a plain channel pursues a spiral path. It is easier to consider the motion in the channel if the scroll is imagined to be stationary and the barrel to be rotating. It is the relative motion between the scroll and the barrel which produces the progress of the rubber. The rubber of the surface of the plain channel moves in a direction at a low angle to the direction of rotation until it meets a flight in which case it descends to a lower level and then transverses across at a large angle to the flights. The spiral is completed by returning to the original level on meeting the flight at the other edge of the channel. The vanes have to be inserted at a sufficient angle to the flights to interfere with the return path but at the same time contribute to generating the forward motion down the channel. Such an angle lies between one third and three times the angle made by the flights in the scroll to the mid-circumferential plane to the extruder. The direction of the vanes 2 is such that they present a greater angle to the mid-circumferential plane than the flights. To achieve the multitude of paths a large number of vanes 2 is desirable. One configuration using two rows of vanes may be employed.

The height of the vanes 2 is generally between 30%–100% of the full depth of the channel. A single ramp 4 located between the flight 8 and the far end of a vane; where the vane 2 is in closest proximity to the flight will break up all the substantial lumps if it is located on a third or further vane from commencement of the blending zone. One ramp may become overloaded. Combining the desire to have the ramps 4 operating as early in the mixing zone as possible, the ramps may be placed on the second and fourth vanes. The ramp must be at least as high as the vanes and may have a clearance of as little as one half of that between the vane and the barrel. The leading faces of the ramps should have a gradient of between 1:10 and 1:2.

What we claim is:

1. A rotatable scroll for an extruding machine comprising a barrel, a helix mounted to rotate in the barrel, channels formed in the helix, a series of vanes in the base of the channels to redirect the material into a surface layer and to direct lumps of material to one edge of the channel and a ramp over which the lumps flow with a small clearance between the ramp and the barrel.

2. A rotatable scroll as in claim 1 in which the scroll is composed of four zones, a feed zone, a compaction zone, a blending zone and a delivery zone.

3. A scroll as in claim 1 in which the height of the vanes is between 30%–100% of the depth of the channels.

4. A scroll as in claim 1 in which the series of vanes in each zone provide a plurality of routes for the material through the channels so that the streams are continually divided and recombined.

5. A rotatable scroll for an extruding machine comprising a series of helical flights extending through four zones, a feed zone, a compaction zone, a blending zone and a delivery zone, channels between the flights, a series of angled vanes of less height than the flights in the base of the channels to provide a plurality of routes for the material through the channels and to ensure that any material occupying the centre of a channel is redirected into a surface layer to provide a highly homogeneous material when reaching the delivery zone and ramps over which the material in the surface layer is forced to flow as it passes from zone to zone.

* * * * *

UNITED STATES PATENT AND TRADEMARK OFFICE
CERTIFICATE OF CORRECTION

PATENT NO. : 4,201,481
DATED : May 6, 1980
INVENTOR(S) : Michael I. Iddon et al

It is certified that error appears in the above-identified patent and that said Letters Patent are hereby corrected as shown below:

Please insert the Foreign Priority Data as follows:

--December 8, 1977 [GB] United Kingdom ....... 51234/77--

Signed and Sealed this

First Day of July 1980

[SEAL]

Attest:

SIDNEY A. DIAMOND

Attesting Officer

Commissioner of Patents and Trademarks